United States Patent [19]

Savary et al.

[11] Patent Number: 4,756,868
[45] Date of Patent: Jul. 12, 1988

[54] MECHANISM FOR CONTROLLING AND SECURING A CONTROL BAR IN A LIQUID COOLED NUCLEAR REACTOR

[75] Inventors: Fernand Savary, Saint Leu La Foret; Rene Peletan, La Varenne Saint Hilaire; Guy Desfontaines, Puteaux; Serge Cochin, Montigny Le Bretonneux, all of France

[73] Assignee: Framatome, Paris La Defense, France

[21] Appl. No.: 822,167

[22] Filed: Jan. 24, 1986

[30] Foreign Application Priority Data

Jan. 24, 1985 [FR] France .................. 85 00989

[51] Int. Cl.⁴ .............................. G21C 7/06
[52] U.S. Cl. ........................ 376/229; 376/228
[58] Field of Search ............... 376/228, 229

[56] References Cited

U.S. PATENT DOCUMENTS

| | | | |
|---|---|---|---|
| 3,088,902 | 5/1963 | Kumpf | 376/229 |
| 3,959,071 | 5/1976 | Bevilacqua | 376/228 |
| 4,544,521 | 10/1985 | Millot | 376/228 |

FOREIGN PATENT DOCUMENTS 54788 6/1982 European Pat. Off. .

OTHER PUBLICATIONS

*Primary Examiner*—Donald P. Walsh
*Attorney, Agent, or Firm*—Pollock, Vand Sande & Priddy

[57] ABSTRACT

Mechanism for displacing and securing the rod of a nuclear reactor control bar, comprising an enclosure coaxial with the rod and forming a hydraulic cylinder in which the rod slides while defining a decompression chamber, a device for mechanically securing the rod in its high position, and a positive displacement reciprocating pump inserted between the decompression chamber and the inside of the tank, whose piston is actuated electromagnetically means and causes at each backward and forward movement lifting of given amplitude of the rod and the device for securing the rod in the high position disengagable also electromagnetically.

10 Claims, 3 Drawing Sheets

MECHANISM FOR CONTROLLING AND SECURING A CONTROL BAR IN A LIQUID COOLED NUCLEAR REACTOR

FIELD OF THE INVENTION

The invention relates to a mechanism for longitudinally moving and for securing a drive rod of a control bar of a nuclear reactor comprising a tank containing a pressurized coolant, said mechanism having an enclosure coaxial with the rod and forming a hydraulic cylinder slidably receiving the rod with which it defines a decompression chamber, and means for mechanically securing the rod in the high position thereof.

The invention is particularly suitable for use in control bar operating mechanisms which are adapted to locate the bars, during a life cycle of the reactor, either in a low position in which they are inserted in the core of the reactor, or in a high position where they are outside the core. This is typically the case of control bars comprising elements containing fertile material for modifying the neutron energy spectrum in a reactor as the fuel therein is progressively exhausted.

BACKGROUND OF THE INVENTION

Mechanisms of the above-defined type are already known. For example, there is disclosed in French Pat. No. 2,496,193 a mechanism whose decompression chamber is connected to a low pressure discharge reservoir by pipe means having a solenoid or electromagnetic valve. The control bar is lifted by opening the electromagnetic valve so as to create a pressure differential which applies an upwardly directed force to the rod. The means for mechanically securing the rod in the high position are formed by a bi-stable toggle device whose condition changes position upon each opening and closure cycle of the electromagnetic valve.

An advantage of such a mechanism is simplicity in design; on the other hand, it has drawbacks. A first drawback is that it is not possible to control, at will and independently, the force tending to lift the bar and the rising speed of the bar. In fact, both values are increasing functions of the degree of opening of the electromagnetic valve and a decreasing function of the leaks between the rod and the cylinder. It is, for example, not possible to increase the lifting force while reducing the speed. In addition, the relationship which exists between the degree of opening of the electromagnetic valve and the force (or the speed) varies over time, especially due to wear or clogging.

Another drawback is related to the fact that reactors typically include several tens of control bars. If each drive mechanism comprises pipe means and an electromagnetic valve connected to a low pressure dump reservoir, a number of pipe lengths must be provided which, since they convey a flow of primary coolant, must comply with very strict safety rules, and must be protected against earthquakes and possible missiles. The pipe lengths and their electromagnetic valves are potential sources of leaks likely to cause uncontrolled lift of control bars.

SUMMARY OF THE INVENTION

It is an object of the invention to provide a drive and securing mechanism which associates the simplicity in design of control by hydraulic coolant discharge with control of the lifting speed.

It is a more specific object of the invention to simplify the control of the mechanisms in a reactor having a large number of control bars, some of which must be displaced simultaneously so as to maintian symmetrical distribution of the neutron flux in the reactor core. It might be thought that this result can be obtained, when the drive mechanism is of the type having discharge pipes and electromagnetic valves, by connecting the decompression chambers of all mechanisms which are to operate simultaneously to a same manifold through a common electromagnetic valve. But such a design must be avoided when the securing means are of the bi-stable type, controlled at each operating cycle of the electromagnetic valve since, if for any reason correcting securing or release does not occur in one of the mechanisms, the latter will later operate in opposition of phase with respect to the other mechanisms connected to the same manifold.

According to a first aspect of the invention, a mechanism of the above-defined type comprises first electromagnetically controlled means placed outside the enclosure, hydraulic means controlled by said electromagnetically controlled means for reducing the pressure of the collant in the decompression chamber so as to cause step by step lift of the rod with a predetermined step and second electromagnetically controlled means, different from the first ones, also placed outside the enclosure, for controlling hydraulic means communicating the decompression chamber with the dump tank so as to cause downward movement of the rod and release of said securing means, said hydraulic means being placed in the enclosure.

According to another aspect of the invention, a mechanism of the above-defined type comprises a positive displacement reciprocating pump inserted between the decompression chamber and the inside of the tank, whose piston is actuated by first electromagnetically controlled means and, upon reciprocation, causes a lift of predetermined amplitude of the rod, and means for securing the rod in the high position releasable by second electromagnetically controlled means.

With this arrangement, the lifting force and the lifting speed may be controlled independently. The lifting force depends mainly on the force exerted by the first electromagnetically controlled means. The lifting speed depends essentially on the rate of actuation of these means. The downward speed of the bar for insertion thereof into the core may be controlled independently, by adjusting the head loss in the flow path between the decompression chamber and the tank, said path being open when the second electromagnetically controlled means are energized.

It will be appreciated that the mechanism of the invention does not comprise pipe lengths conveying the primary coolant outside the tank, which simplifies the overall design and removes the risks of leaks which may cause uncontrolled withdrawal of the control bars or the need to permanently make up for these leaks. Finally, because the function of lifting the rod and the function of securing the rod are separate, the first electro-magnetically controlled means of several bars may be controlled by a same generator without the risk of out of phase operation should the securing system of one of the mechanisms fail during one operation.

Bar fall may be caused by gravity, by opening a coolant flow path between the inside of the tank and the decompression chamber. In another embodiment, the pump is used for accelerating the fall speed.

BRIEF DESCRIPTION OF THE DRAWINGS

The invention will be better understood from the following description of particular embodiments, given by way of examples only. The description refers to the accompanying drawings, in which.

DETAILED DESCRIPTION OF THE INVENTION

Figure 1:
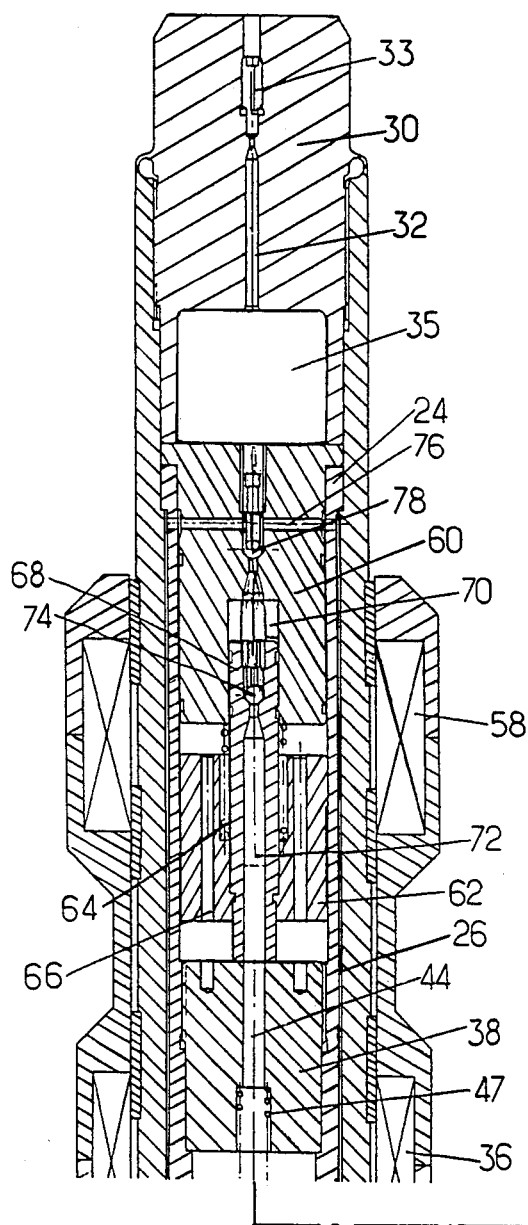
- FIG. 1 is a vertical sectional view of a first mechanism in accordance with the invention, the rod being shown secured in its high position (dash dot line) and in its top abutment position (continuous line)
Figure 1:
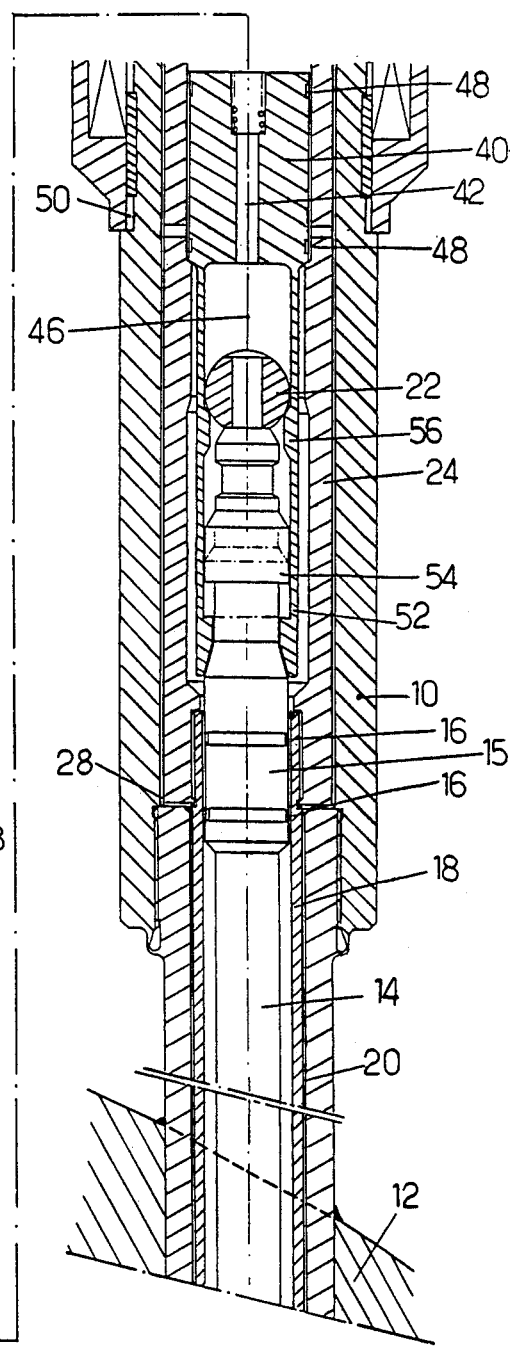

Referring to FIG. 1, an operating and securing mechanism is housed in a tubular enclosure 10 made from several parts assembled together. The enclosure projects through the cover 12 of the tank of the reactor, constructed so as to withstand the pressure of the primary coolant of the reactor. The enclosure accomodates a rod 14 for driving the control bar, connected to the latter by a releasable coupling, (not shown). The rod has, in the vicinity of its top end, an enlargement 15 forming a piston, having sealing rings 16. A linear 18 is fitted inside enclosure 10 and is fixed, at its upper part, to a second liner 24. It has an inner diameter such that rings 16 slide over the liner substantially sealingly. The outer diameter of liner 18 is such that an annular space 20, opening into the tank, exists between liner 18 and enclosure 10. The liner 18 extends sufficiently high for the segments to remain in contact therewith, even when the rod occupies the high position, shown in FIG. 1. When in that high position, the drive rod 14 is in abutment against a transverse cam-forming pin 22 placed across the enclosure. The second liner 24 is fitted inside the enclosure 10, in the extension of liner 18. With the enclosure it defines a second annular space 26 which communicates with space 20 through radial grooves 28.

The upper part of the enclosure 10 is closed by a sealing plug 30 in which is formed a drain hole 32 closed by a screw 33.

During filling of the primary circuit of the reactor, it may happen that air is trapped in the pressurized enclosure of the mechanism. A collecting chamber 35, having a volume considerably greater than that occupied by the air at normal service pressure, is provided under the plug.

The mechanism of the invention comprises, first, a disengageable device for securing the control rod in the high position and, second, a step-by-step lifting device. The two devices will be described successively.

SECURING DEVICE

The securing device is located within liner 24. It comprises electromagnetically actuated means having a fixed unit and a movable unit. The fixed unit comprises an operating coil 36 placed outside the enclosure and coaxially with this latter and a fixed pole piece 38 fixed inside liner 24. The movable unit includes a pole piece 40 movable between a low position (FIG. 1) and a high position in which it is in abutment against the fixed pole piece 38. The two pole pieces have axial passages 42 and 44 formed therein for communicating the volume defined by the rod and liner 24, which forms a decompression chamber 46, with the volume situated above the fixed pole piece 38. A return spring 47 tends to bring and maintain the fixed pole piece 40 in the low position in which it is shown in FIG. 1.

The movable pole piece 40 forms both a distributing valve and a releasable gripping mechanism for securing the rod, it has two sealing rings 48 axially spaced apart from each other and sealingly slidable on the internal face of liner 24. Holes 50 are formed through liner 24 at a location such that they open between rings 48 when the pole piece 40 is in its low position and so that they communicate the annular space 26 with the decompression chamber 46 when the pole piece 40 is raised, i.e. when the operating coil 36 is energized.

So that the pole piece 40 may operate as a gripping mechanism, it has flexible downwardly directed blades 52 formed with end gripping catches. These catches have a shape such that the blades may be moved apart by a bulge 54 on rod 14 when the latter arrives at its upper end of travel, but such that they cannot be spread apart by the weight of the rod.

Means are provided for forcibly opening the blades by raising the movable pole piece 40. As shown in FIG. 1, these include pin 22 and inward 14 directed bosses 56 on the blades. The bosses 56 are placed so as to be immediately below pin 22 when the movable pole piece 40 is in the low position, and to come in alignment with the pin when the movable pole piece 40 is raised.

MECHANISM FOR DISPLACING THE ROD

The mechanism for displacing the rod comprises essentially an electromagnetically controlled piston pump having a fixed part and a mobile part.

The fixed part of the pump comprises a coil 58 similar to coil 36 and a fixed pole piece 60 inside liner 24. Sealing between liner 24 and pole piece 60 is provided by one or more rings.

The movable part of the pump is formed by a pole piece 62 movable between a rest position (FIG. 1) and a work position into which the fixed pole piece 60 piece 62 is moved into the work position by coil 50a when the latter is energized. A return spring 64 compressed between the pole pieces biases piece 62 to its low position. Passages 66 are formed in the movable pole piece 62 for balancing the fluid pressures exerted on the surfaces thereof.

The movable pole piece 62 has an extension or reduced diameter, forming a plunger 68 having sealing rings which projects into a recess in the fixed pole piece 60 for defining a pumping chamber 70. The hydraulic circuit of the pump comprises an axial passage 72 in the plunger, provided with an intake non-return check valve 74, connecting the pumping chamber 72 with the volume situated below the movable pole piece 62 and so to the decompression chamber. This circuit further comprises, starting from the pumping chamber 70, a duct 76 provided with a delivery check valve 78. This duct 76 is extended by one or more holes formed in liner 24, so that duct 76 is in permanent communication with the inside of the tank of the reactor.

The intake and delivery valves may be of conventional construction and formed for instance by a ball urged by a return spring onto a seat.

It will be appreciated that the pump thus formed is wholly integrated within liner 24, except for the operating coil 58.

OPERATION

Operation of the mechanism will now be described with reference to FIGS. 2A-2B, in which only the main elements of the mechanisms have been shown, the scale not being respected for the scale of increased clarity.

LIFT OF THE DRIVING ROD

The driving rod is moved up step-by-step, each step corresponding to an energization-de-energization cycle of coil 58. Each energization of coil 58 moves the pole piece 62 from the position shown in FIG. 2A to the position in abutment against the fixed pole piece 60. The contents of the pumping chamber 70 is discharged through duct 76 and the annular spaces 26 and 20 into the tank. The lifting movement causes an upwardly directed force on rod 14. If the leaks are negligible, the force is equal to the product of the force exerted on the movable pole piece 62 multiplied by the ratio $S_1/S_0$, $S_1$ being the cross-sectional area defined by the rings of piston 15 and $S_0$ the cross-sectional area of plunger 68. The stroke of rod 14 is equal to the stroke of the movable pole piece 62 multiplied by the ratio $S_0/S_1$.

When coil 58 is de-energized, the movable pole piece 62 moves back to its rest position. Liquid flows to the pumping chamber 70 from the decompression chamber 46 through the intake valve 74. Since downward movement of the mobile pole piece 62 takes place without variation of the volume offered to the liquid above rod 14, the latter remains in place.

Consequently, each energization-de-energization cycle of coil 58 causes upward movement of the drive rod 14 by a height equal to the product of the stroke of the movable pole piece by the ratio $S_0/S_1$.

SECURING

During the final portion of the lifting stroke of the drive rod 14, that rod penetrates between blades 62. The prestress of spring 47 is selected at a value greater than the vertical force which bulge 54 must exert to spread blades 52 apart. Consequently, bulge 34 passes beyond the blades without driving the movable pole piece 40. As soon as the lower shoulder of bulge 54 has moved beyond the end catches of the flexible blades 52, the latter close again and prevent the drive rod from moving down, as shown with continuous line in FIG. 1.

A sensor is advantageously provided for supplying a signal when the drive rod has passed beyond the level of the catches. The sensor is, for example, a flexible blade switch (not shown) placed in a sealed bulb outside enclosure 10 for actuation by a permanent magnet mounted at the upper part of rod 14. The signal supplied by the sensor may be used for stopping the repetition of the energization-de-energization cycle of coil 58.

Figure 2A:
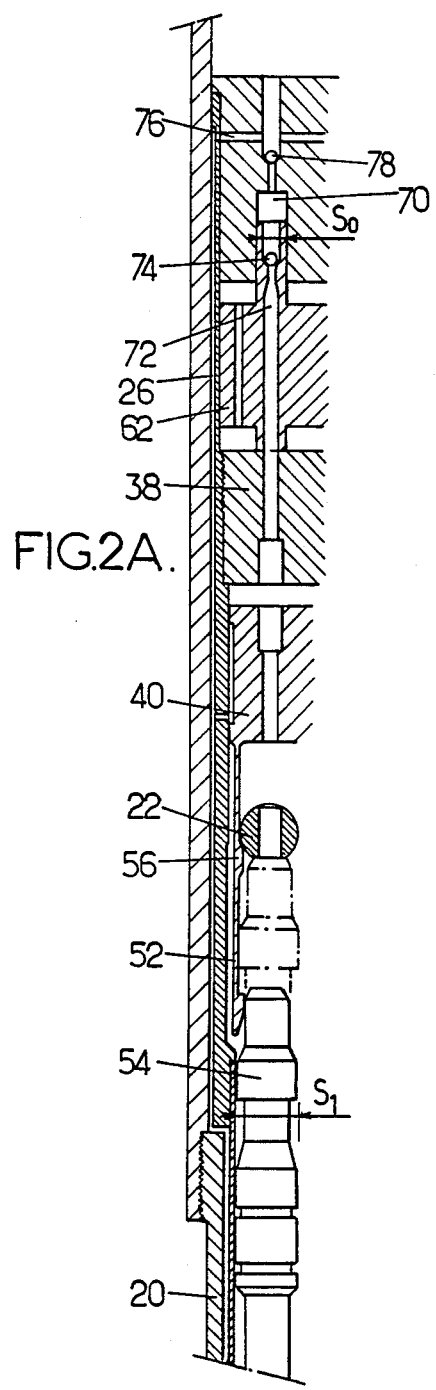
FIGS. 2A and 2B are general hydraulic diagrams illustrating operation of the mechanism of FIG. 1.
Figure 2B:
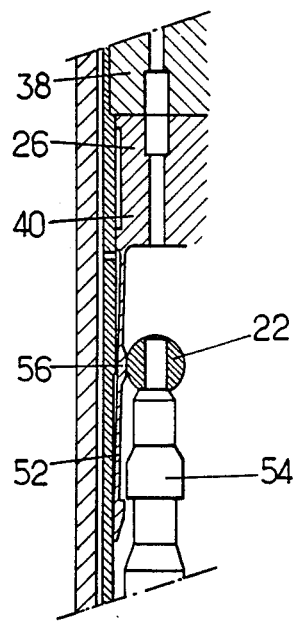

If there is no leak at the sealing rings or ball valves, the drive rod 14 remains in its high position, in abutment against pin 22, as shown in dot dash lines in FIG. 2A. If there are leaks, rod 14 moves slowly down until it bears on the catches of the flexible blades 52 whose profile is such that the weight of the drive rod and control bar tends to close the blades further, as shown in dot-dash lines in FIG. 1. The control bar is thus held in a position where it is outside the core.

RELEASE

The release operation will generally take place while the parts are in the initial position shown in dot-dash lines in FIG. 1. Then rod 14 is first of all raised by operating the lift mechanism until the sensor (not shown) indicates that the rod is clear of the catches of blades 52. Then the control coil 36 is energized to raise the movable pole piece 40. During the upward movement, the flexible blades 52 are moved apart by pin 22 and the decompression chamber 46 is connected to the tank through the annular spaces 20 and 26. The drive rod and the control bar then move slowly down under the action of their weight, the falling speed being determined by the head loss which is adjustable by metering the flow area of holes 50 appropriately.

Figure 3A:
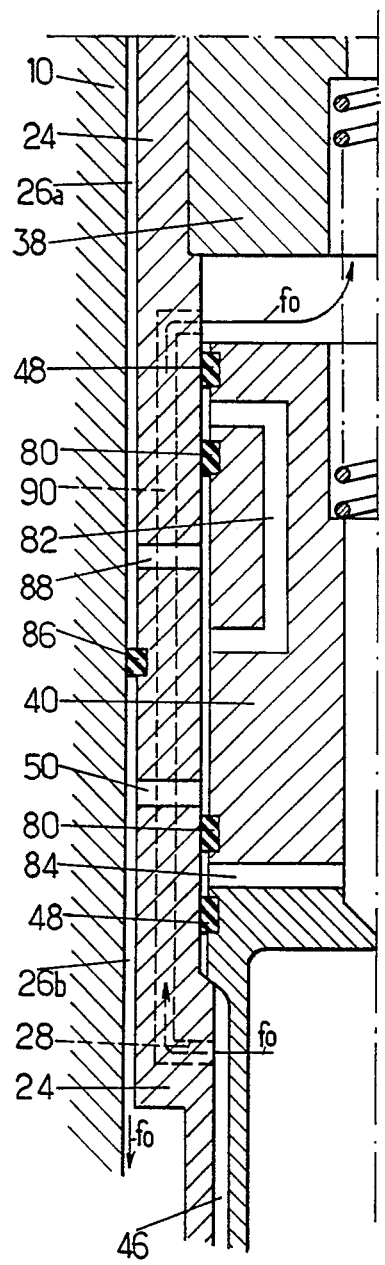
FIGS. 3A and 3B are enlarged diagrammatic views of a fraction of a mechanism forming a modification of that of FIG. 1, in two operating conditions.
Figure 3B:
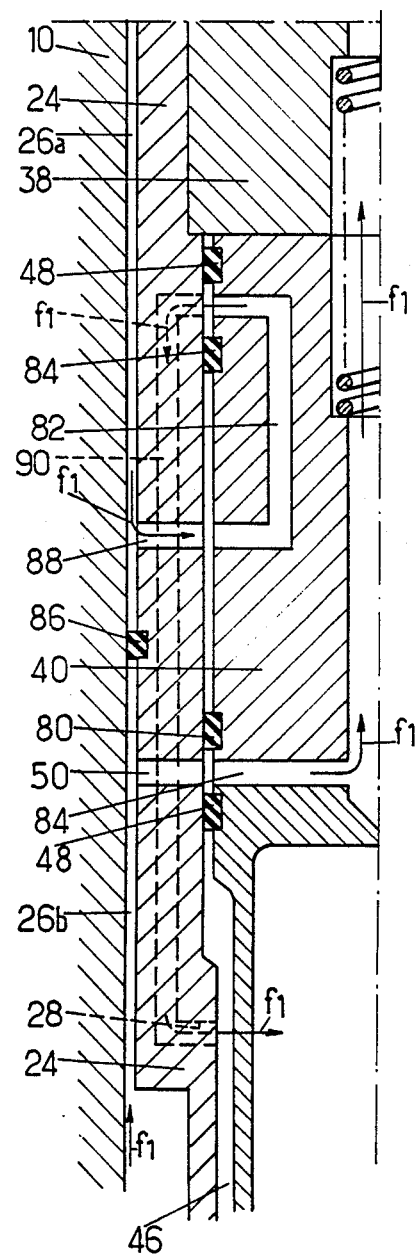

Numerous modifications are possible, in respect of the securing means and the rod displacement means. FIGS. 3A and 3B show schematically a modification of the securing means allowing the pump to be used for accelerating downward movement of the rod and the control bar.

In FIGS. 3A and 3B, the parts corresponding to those in FIG. 1 are designated by the same reference numbers. The displacement means are unchanged. The securing means again comprises a movable pole piece 40. On the other hand, it comprises, in addition to the sealing rings 48, two rings 80 each placed close to a ring 48, but at a smaller distance from the middle of the pole piece. In the pole piece 40 are formed two internal ducts 82 and 84. Duct 82 connects the space between the upper pair of rings 48 and 80 and the space between rings 80. Duct 84 connects the central hole 42 of pole piece 40 (which then is a blind hole) to the space defined by the lower pair of rings 80 and 48.

As shown in FIGS. 3A and 3B, the annular space 26 is separated by a seal 8 into a top part and a bottom part. Holes 50 connect the low part to a zone of the bore in liner 24 which is located between rings 80 when the pole piece is at rest (FIG. 3A), facing duct 84 when this pole piece comes into abutment against the fixed pole piece 38 following energization of the control coil (FIG. 3B). Transfer holes 88 connect the top part 26A to a zone of the bore in liner 24 situated between rings 80 whatever the position of the mobile pole piece 40.

Finally, an internal transfer channel 90 formed in the body of liner 24 places the decompression chamber 46 in communication with a zone of the bore of liner 24 which is situated above rings 48 and 80 when the mobile pole piece 40 is at rest (FIG. 3A), between rings 48 and 80 of the upper pair when the control coil 36 is energized (FIG. 3B).

In the modification shown in FIGS. 3A and 3B, lifting of the bar is provided by means of a pump while maintaining the mobile pole piece 40 at rest (FIG. 3A). The downward movement of the bar is caused by bringing the mobile pole piece 40 into the position shown in FIG. 3B. It can be seen that the downward movement occurs, as in the case shown in FIG. 1, if the pump is maintained at rest, but through valves 74 and 78.

When it is desired to accelerate the downward movement of the bar, it is sufficient to activate the pump.

In both cases, the water flow takes place along the path indicated by arrows f1 in FIG. 3B, which may be compared with the lifting path indicated by arrows f0 in FIG. 3A.

Whatever the embodiment used, it must be initially filled with pressurized liquid coolant after it has been assembled. For that purpose, the control coil 36 is energized for communicating the decompression chamber 46 with the annular space 26. Filling of the pumping chamber 70 then takes place when the pressure of the primary coolant is increased. Valve 74 opens to allow this filling. Then the collecting chamber 36 is filled through the annular space 26 and ducts 76 and may be scavenged by opening the screw 33.

What is claimed is:

1. In a nuclear reactor having a tank containing a pressurized coolant and control bars each provided with a drive rod, a mechanism for longitudinally moving and for securing a drive rod, having an enclosure coaxial with the rod and forming a hydraulic cylinder slidably receiving the rod with which it defines a decompression chamber, and means for mechanically securing the rod in the high position thereof, said mechanism comprising first electromagnetically controlled means placed outside the enclosure, hydraulic means controlled by said electromagnetically controlled means for reducing the pressure of the coolant in the decompression chamber so as to cause step by step lift of the rod with a predetermined step and second electromagnetically controlled means, different from the first ones, also placed outside the enclosure, for controlling hydraulic means communicating the decompression chamber with the tank so as to cause downward movement of the rod and release of said securing means, said hydraulic means being placed in the enclosure.

2. A mechanism according to claim 1, wherein the first and second electromagnetically controlled means comprise a first coil and a second coil which may be independently energized, said second coil causing release of the rod and connecting the compression chamber to the tank when it is energized.

3. In a nuclear reactor having a tank containing pressurized liquid coolant and vertically movable control bars each supported by a drive rod, a mechanism for vertically moving and for securing a drive rod having an enclosure coaxial with the rod and forming a hydraulic cylinder slidably receiving the rod with which it defines a decompression chamber, and means for mechanically securing the rod in the high position thereof, said mechanism comprising a positive displacement reciprocating pump inserted between the decompression chamber and the inside of the tank, whose piston is actuated by first electromagnetically controlled means and, upon reciprocation, causes a lift of predetermined amplitude of the rod, and means for securing the rod in the high position releasable by second electromagnetically controlled means.

4. A mechanism according to claim 3, wherein the pump comprises a pole piece movable by the first electromagnetically controlled means between two predetermined positions, comprising a plunger co-operating with a fixed piece for defining a variable volume pumping chamber connected to the hydraulic cylinder by an intake valve and to the tank by a discharge valve.

5. A mechanism according to claim 4, wherein said plunger defines the pumping chamber with a fixed pole piece belonging to the first elecromagnetically controlled means, one of the predetermined positions corresponding to the abutment of the movable pole piece against the fixed pole piece.

6. A mechanism according to claim 4, wherein the pumping chamber has a section smaller than that of the hydraulic chamber, so that the pressure differential force on the rod is greater than the force exerted by the first electromagnetically controlled means on the movable pole piece.

7. A mechanism according to claim 3, wherein a hydraulic flow path between the discharge valve and the tank comprises an annular space formed between a liner linking said enclosure on the inside and said enclosure.

8. A mechanism according to claim 3, wherein the securing means comprise a pole piece having downwardly directed flexible blades and ending in catches for gripping a bulge on the rod, movable between a low position in which the blades are in a position where they prevent the rod from moving downwards once the bulge has passed upwardly beyond the catches and a high position in which the blades are moved apart by a cam so as to release the rod.

9. A mechanism according to claim 8, wherein the movable pole piece forms a distributor opening a leak path between the cylinder and the tank when in a high position.

10. A mechanism according to claim 3, wherein the securing means are provided for reversing the connections of the hydraulic means with the decompression chamber and with the tank when they are disengaged, so as to accelerate the downward movement of the rod by actuation of said hydraulic means by means of the first electromagnetically controlled means.

* * * * *